United States Patent
Weiss et al.

(10) Patent No.: US 7,383,813 B2
(45) Date of Patent: Jun. 10, 2008

(54) METHOD AND DEVICE FOR CONTROLLING THE TRANSITION BETWEEN NORMAL OPERATION AND OVERRUN FUEL CUT-OFF OPERATION OF AN OTTO ENGINE OPERATED WITH DIRECT FUEL INJECTION

(75) Inventors: Frank Weiss, Pentling/Grasslfing (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 22 days.

(21) Appl. No.: 10/565,949

(22) PCT Filed: Apr. 21, 2004

(86) PCT No.: PCT/EP2004/050572

§ 371 (c)(1),
(2), (4) Date: Jan. 26, 2006

(87) PCT Pub. No.: WO2005/012712

PCT Pub. Date: Feb. 10, 2005

(65) Prior Publication Data

US 2006/0231068 A1    Oct. 19, 2006

(30) Foreign Application Priority Data

Jul. 28, 2003    (DE)    ................................ 103 34 401

(51) Int. Cl.
*F02D 41/12*    (2006.01)
*F02P 5/00*    (2006.01)

(52) U.S. Cl. ................. 123/325; 123/406.47; 123/481; 123/493

(58) Field of Classification Search ................. 123/295, 123/299, 305, 443, 325, 332, 406.23, 406.47, 123/481, 493, 329, 198 DB
See application file for complete search history.

(56) References Cited

U.S. PATENT DOCUMENTS

| 5,722,363 | A |  | 3/1998 | Iida et al. |
| 6,058,905 | A | * | 5/2000 | Nagaishi et al. ............ 123/295 |
| 6,178,943 | B1 | * | 1/2001 | Taga et al. .................. 123/295 |
| 6,345,499 | B1 |  | 2/2002 | Nishimura et al. |
| 6,510,834 | B1 | * | 1/2003 | Tomita et al. ............... 123/295 |

(Continued)

FOREIGN PATENT DOCUMENTS

| DE | 27 38 886 C3 |  | 3/1979 |
| DE | 101 54 974 A1 |  | 5/2003 |
| JP | 04060148 A |  | 2/1992 |
| JP | 05321718 A |  | 12/1993 |
| JP | 2001-152835 | * | 6/2001 |
| JP | 2003-27998 | * | 1/2003 |
| JP | 2006-9704 | * | 1/2006 |
| JP | 2006-16973 | * | 1/2006 |

Primary Examiner—Hai H Huynh

(57) ABSTRACT

The problem during overrun fuel cut-off operations, i.e. cut-off of fuel injection during trailing throttle conditions of the vehicle, is that the transition entails an undue torque jump, resulting in the smooth operation of the engine and the driving comfort of the passengers of the vehicle being affected. The aim of the invention is to reduce the torque jump. Said aim is achieved by injecting fuel into a cylinder of the Otto engine in a multiple injection process, at least a partial quantity of the fuel that is to be injected being injected during the compression phase, whereby the quantity of air that is taken in advantageously decreases because no internal cooling takes place while the efficiency is advantageously reduced due to the lesser degree of swirling, resulting in lower torque. Overall, torque (DM) is reduced to a significantly greater extent than by merely adjusting the spark angle (ZW) while smooth operation of the Otto engine is not affected.

18 Claims, 2 Drawing Sheets

U.S. PATENT DOCUMENTS

| | | | |
|---|---|---|---|
| 6,557,524 B2* | 5/2003 | Tsunooka | 123/399 |
| 6,708,668 B2* | 3/2004 | Yoshida et al. | 123/295 |
| 7,007,462 B2* | 3/2006 | Kitahara | 60/285 |
| 7,013,637 B2* | 3/2006 | Yoshida | 60/285 |
| 2004/0123834 A1* | 7/2004 | Wagner et al. | 123/295 |
| 2004/0163379 A1* | 8/2004 | Pott et al. | 60/284 |
| 2005/0039444 A1* | 2/2005 | Nishizawa et al. | 60/285 |
| 2007/0055436 A1* | 3/2007 | Weiss et al. | 701/101 |

* cited by examiner

METHOD AND DEVICE FOR CONTROLLING THE TRANSITION BETWEEN NORMAL OPERATION AND OVERRUN FUEL CUT-OFF OPERATION OF AN OTTO ENGINE OPERATED WITH DIRECT FUEL INJECTION

CROSS REFERENCE TO RELATED APPLICATIONS

This application is the US National Stage of International Application No. PCT/EP2004/050572, filed Apr. 21, 2004 and claims the benefit thereof. The International Application claims the benefits of German application No. 10334401.2 filed on Jul. 28, 2003. All of the applications are incorporated by reference herein in their entirety.

FIELD OF THE INVENTION

The invention takes as its starting point a method or an apparatus, whereby the transition between normal operation and overrun fuel cut-off operation can be controlled in an Otto engine which is operated with direct fuel injection.

BACKGROUND OF THE INVENTION

When switching over from the normal operation to the overrun fuel cut-off operation, there is inevitably a torque jump which can cause an irregular running of the Otto engine or an unwanted judder of the vehicle. The advantages which per se derive from the overrun fuel cut-off, such as a reduction in the fuel consumption, improved braking effect of the engine and lower noise emissions, for example, must be obtained at the expense of a degradation in driving comfort. The same problem arises when, after the overrun fuel cut-off operation, the normal driving operation of the vehicle must be resumed and the Otto engine must again generate a desired torque and deliver it to the vehicle.

Various measures have already been proposed for reducing this undesirable or acceptable torque jump which is caused by the cut-off of the fuel injection in the overrun operation. The transition was not controlled in older engines, for example, i.e. the fuel injection was simply stopped in the overrun fuel cut-off operation.

A known and relatively effective measure for counteracting the torque jump during the transition to the overrun fuel cut-off is to adjust the ignition angle significantly in the direction of ignition retard, such that the combustion of the fuel-air mixture in the cylinder of the Otto engine is still reliably guaranteed. In this case, the fuel continues to be injected during the intake phase until the switchover into the overrun operation. This results in a reduced torque, since the fuel-air mixture can no longer develop its full power in the retarded ignition phase. In many cases, however, this reduction is not sufficient to achieve a gentle transition to the overrun fuel cut-off.

SUMMARY OF THE INVENTION

The invention addresses the problem of producing a method and an apparatus by means of which a clearly greater reduction in the torque jump can be achieved. This problem is solved by the features in the claims.

In the claimed method or the apparatus for controlling the transition between normal operation and overrun fuel cut-off in an Otto engine which is operated with direct fuel injection, said method and apparatus having the characterizing features of the respective claims, the advantage emerges that the torque reduction is essentially greater than if solely the ignition angle is adjusted. This is because, as a result of injecting at least a partial quantity of the fuel during the compression phase, three beneficial effects are produced for curbing the torque. Firstly, the mass of air that is taken in decreases due to the reduced internal cooling in the cylinder, because part of the injected fuel quantity is injected at the time point when the valves of the cylinder are already closed (compression phase). Secondly, the efficiency of the combustion decreases because the fuel which is in the cylinder is swirled less vigorously when injection takes place in the compression phase. Finally, measurements have also shown advantageously that the smooth running of the Otto engine does not change if the ignition angle is adjusted even further in the retard direction after the injection of fuel. Consequently, the injection angle can be adjusted even further in the retarded injection direction than would be the case in the known simple adjustment of the injection angle. It is further considered particularly advantageous that the torque jump can be reduced in a manner which is essentially more effective by means of the claimed method or by means of the apparatus, such that the advantages of the overrun fuel cut-off can be utilized without the driving comfort for the passengers of the vehicle being adversely affected by the torque jump.

The measures which are set out in the dependent claims specify advantageous developments and improvements of the method or apparatus that are specified in the respective claims. A method which is particularly simple to control is produced if the air mass that is taken in is first reduced and subsequently the ignition angle is decreased to a first minimal value, said value being predetermined for this operating mode, at which trouble-free combustion of the fuel-air mixture is still possible. This ensures that a reliable combustion of the fuel-air mixture is still guaranteed even in the case of these unfavorable ratios and that a certain torque portion is still generated in this type of operation.

After the minimal ignition angle has been reached, the fuel is injected into the cylinder during the compression phase when the valves are closed. This is contrary to the otherwise usual procedure, in which the fuel is injected in the intake phase, i.e. when the valves are open. In the claimed method therefore, the advantage is produced that the ignition angle can be decreased even further than would have been the case in the known ignition angle adjustment. The ignition angle can now be decreased to a second minimal value, which is lower and applies to the multiple injection, since the fuel-air mixture in the cylinder remains combustible.

Only after the second minimal value for the ignition angle has been reached is it possible to cut off the fuel injection and switch over to overrun fuel cut-off operation.

When the vehicle is switched over from overrun fuel cut-off operation to normal operation, a check first ascertains whether it is necessary to carry out the injection. If this is the case, the fuel to be injected is deposited in the compression phase. As a result, the torque is slowly built up and an unwanted torque jump is avoided.

In order to facilitate the transition to the normal operation, the air mass to be taken in is increased and the ignition angle is adjusted in the advanced ignition direction.

Once a predetermined desired torque has been reached, it is possible to switch over to the fuel injection in the intake phase. The control procedure for the switchover is then complete.

In a development of the apparatus, the fuel can be deposited in partial quantities, e.g. in two partial quantities in the output phase and in the compression phase. Therefore it is easy to perform an adjustment to different engine variants or load states or the engine. The method is therefore universally applicable.

BRIEF DESCRIPTION OF THE DRAWINGS

An exemplary embodiment of the invention is illustrated in the drawing and is explained in greater detail below.

DETAILED DESCRIPTION OF THE INVENTION

Figure 1:
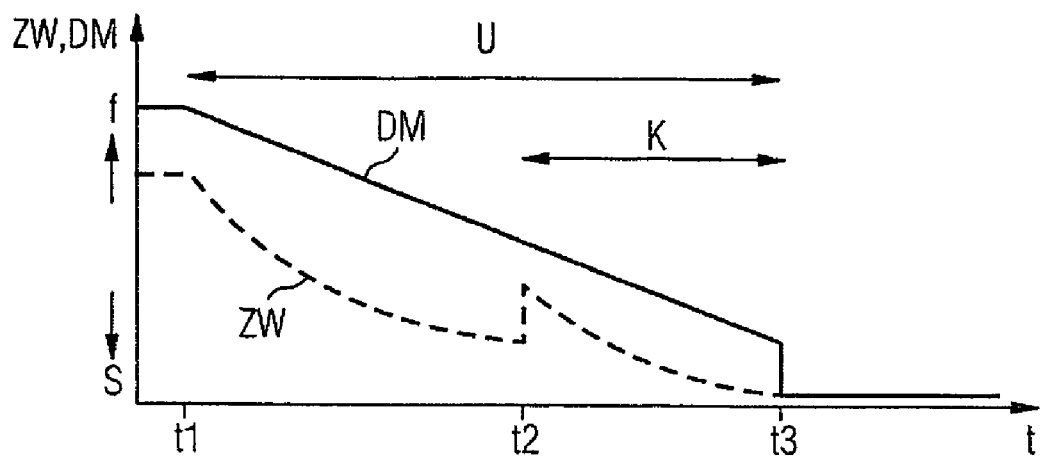
FIG. 1 shows an exemplary embodiment in the form of a diagram for the control of the switchover from normal operation to overrun fuel cut-off operation.

The diagram in FIG. 1 shows the schematic sequence of a switchover of an Otto engine, said engine being operated with direct fuel injection, from the normal operation into the overrun fuel cut-off operation. In this diagram, a time t corresponding to the angle of rotation of the crankshaft is plotted on the x-axis, while the torque and the ignition angle are plotted on the y-axis. The advance ignition f is plotted towards the top and the retarded ignition s is plotted towards the bottom. The curve DM shows the profile of the calculated torque and the curve ZW shows the profile of the current ignition angle during the switchover phase.

In the left-hand part of the diagram, the Otto engine is operated in the normal operating mode until the time point t1. According to the curve DM, the delivered torque is relatively high. Since the torque at the engine cannot be measured directly, it is usually estimated by arithmetic means with the aid of a torque model. In order to determine a current torque, various engine parameters and operating parameters are captured and entered into the torque model, e.g. a rotational speed, a gas pedal position, a throttle valve position, the ignition angle, the injection mode, temperature, vehicle speed, etc. The torque model per se is known and therefore need not be explained in further detail.

The diagram also shows that the curve for the ignition angle ZW is positioned on advance ignition f until the time point t1. The adjustment of the ignition usually takes place by electronic means and is based on the signals of a rotational speed sensor.

The switchover phase U to the overrun fuel cut-off operation starts at the time point t1 and ends at the time point t3. The curves are illustrated in an exaggerated manner for clarity. With effect from the time point t1, the air mass in the cylinder is decreased to a minimal value by adjusting the throttle valve, and the ignition angle ZW is adjusted to a first minimal value in the retarded ignition s direction accordingly. The first minimal value for the ignition angle ZW, at which a reliable combustion of the fuel-air mixture is still guaranteed, is reached at the time point t2. As a result of this, the torque decreases in accordance with the curve DM. At the time point t2, the injection starts in the compression phase K which lasts until the time point t3. The fuel injection is not now cut off in this period t2-t3, but instead at least a partial quantity is deposited in the compression phase. The injection can be deposited in a partial quantity in the compression phase if the valves of the cylinder are closed, wherein the other partial quantity is injected in the output phase, or alternatively can be deposited entirely in one injection cycle.

The torque decreases further as a result of the injection in the compression phase, as is evident from the profile of the curve DM. The ignition angle ZW is briefly adjusted in the advance direction and can subsequently be reduced to a second minimal value which is even lower than the first minimal value. The second minimal value for the ignition angle ZW is reached at the time point t3. The torque is now reduced to such an extent that it impossible to switch over to the overrun fuel cut-off operation without the smooth running of the Otto engine being noticeably affected. An essentially smoother transition to the overrun fuel cut-off has therefore been achieved.

If a greater torque is demanded from the engine, provision is made for switching back into normal operation. This procedure takes place in the reverse manner and is explained in greater detail below with reference to FIG. 2.

Figure 2:
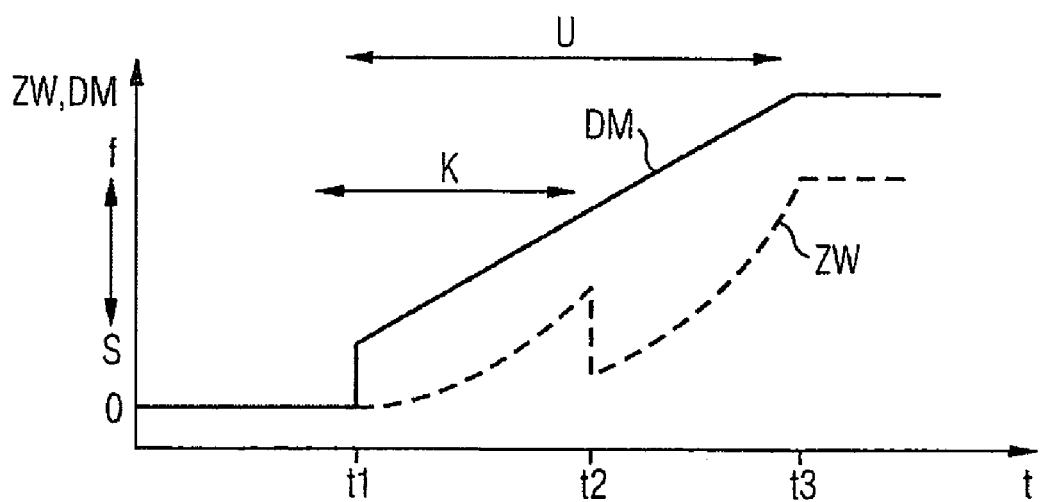
FIG. 2 shows a second diagram for the control of the switchover from overrun fuel cut-off operation to the normal operation.

The diagram in FIG. 2 is constructed in accordance with the diagram in FIG. 1. As shown in FIG. 2, the switch back to the normal operation starts at the time point t1. This is subsequently followed by the switchover phase U until the time point t3. The injection in the compression phase K takes place between the two time points t1 and t2.

Provision is made, depending on the current operating situation, for carrying out an evaluation beforehand to determine whether an injection of fuel is required in the compression phase when switching back to the normal operation also. For example, in the case of a low rotational speed of the engine, it may be possible to omit the injection in the compression phase and instead inject immediately in the intake phase. In order to aid understanding, the case is explained below in which fuel will be injected in the compression phase K when switching back also.

In accordance with FIG. 2, the ignition and the injection are cut off until the time point t1. After this, the ignition angle is adjusted in the advance direction (advanced ignition f) until the time point t2. In this compression phase between t1 and t2, the injection of fuel takes place in partial quantities or as a single pulse as described above. From the time point t2, the torque DM has increased to such an extent that it is possible to switch over to an injection in the intake phase if the valves of the cylinder are open. The ignition angle ZW is then adjusted in the advanced ignition f direction in accordance with the curve which is drawn as a broken line. From the time point t3, the torque has again increased to such an extent that the normal operation can be resumed without noticeably affecting the smooth running of the Otto engine.

Figure 3:
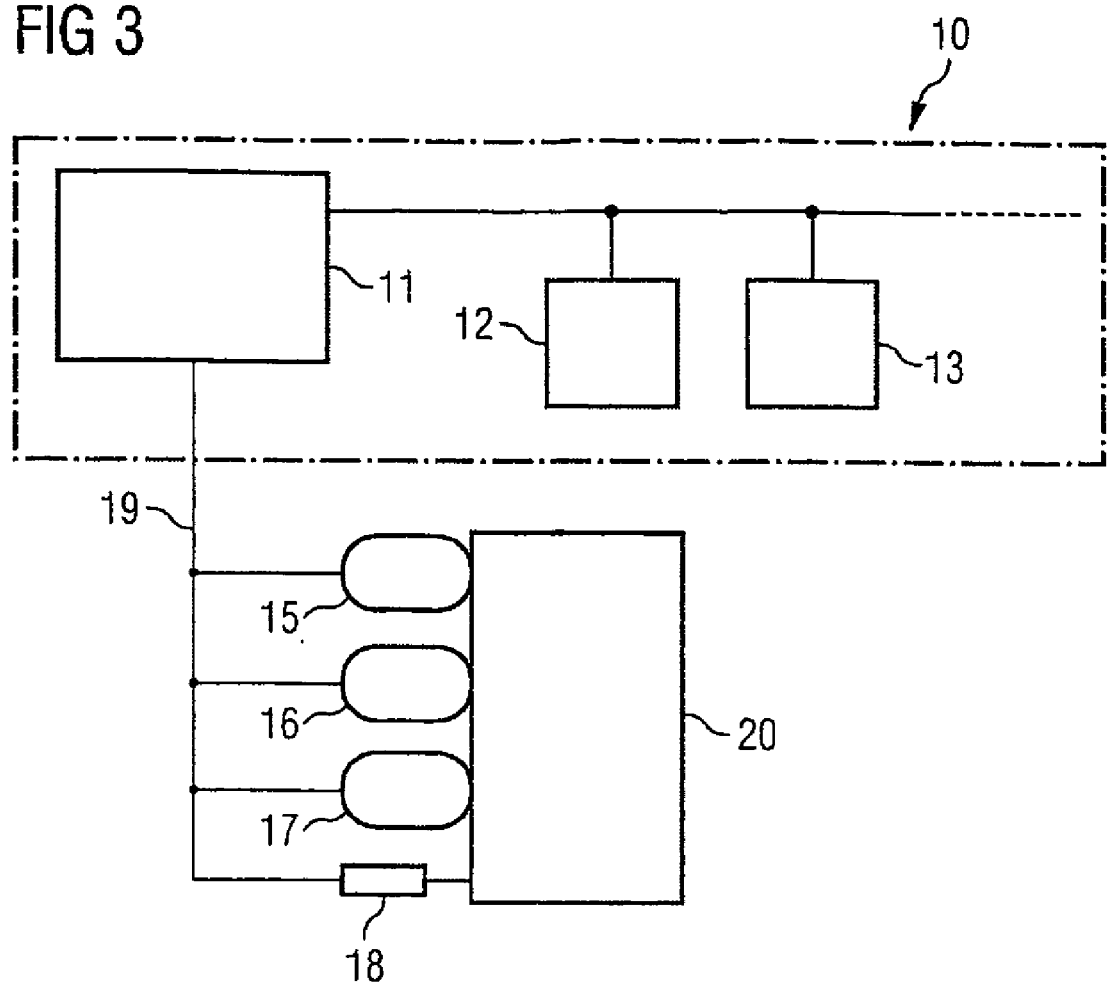
FIG. 3 shows a schematic illustration of a functional block diagram of the apparatus according to the invention.

FIG. 3 shows a schematic illustration of an apparatus for controlling the transition between the normal operation and the overrun fuel cut-off operation in an Otto engine which is operated with direct fuel injection. The apparatus (switchover apparatus 10) has a control unit 11 which can be controlled using a corresponding software program. Furthermore, the control unit 11 is designed to include a program storage 12 and a data storage 13. The data storage 13 can store a torque model, for example, by means of which the current torque delivered by the engine can be estimated. Provision can also be made for further units, e.g. for specifying the rotational speed and the angle of rotation of the crankshaft.

Furthermore, the control unit 11 is preferably connected to corresponding sensors or regulators via a bus 19 (data and control bus), said sensors or regulators being arranged at the Otto engine. For example, provision is made for a device for capturing the angle of rotation 15, an actuator for a throttle valve adjustment 16, a rotational speed sensor 17, one or more injection valves 18, etc. These units are normally present in any case, since they are required in any case for the control program of the engine management system.

An alternative configuration of the invention provides for the control program, which is used for controlling the transition between the normal operation and the overrun fuel cut-off operation or vice versa, to be included as a subprogram in the management system of the engine control. This advantageously avoids any use of additional hardware.

Figure 4:
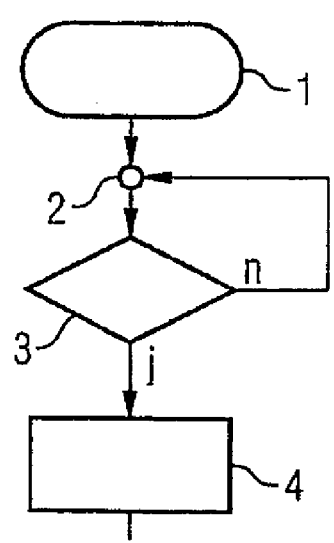
FIG. 4 shows a flow diagram which illustrates the transition from normal operation to overrun fuel cut-off operation.

In a schematic illustration of a flow diagram, FIG. 4 shows how the transition from normal operation to overrun fuel cut-off operation is controlled. In position 1 the program is started and, after decreasing the air mass in the cylinder (adjusting the throttle valve 16), the ignition angle is adjusted in the retard direction. In position 3 a query determines whether the current ignition angle is less than the predetermined minimal value for the ignition angle. If this is not the case (if n applies), the program jumps back to position 2. The ignition angle is decreased further and the query in position 3 is reinitiated.

If the ignition angle ZW is then less than the predetermined first minimal value, the program jumps forward to position 4. The fuel injection in the compression phase now begins, and therefore the ignition angle can be decreased after a short increase to the second predetermined minimal value. This causes the torque to decrease further, thereby finally achieving a smooth transition to the overrun fuel cut-off. After the switchover to the overrun fuel cut-off operation, this program routine is terminated.

The return from the overrun fuel cut-off to the normal operation fundamentally takes place in the reverse order. A check first ascertains whether, on the basis of the torque requirement, a fuel injection is actually required in the compression phase. If this is the case, at least a partial quantity of the fuel is initially deposited in the compression phase. As a result, the torque increases to the extent that it is possible to switch over to the entire injection in the intake phase. The injection can now be switched over to the normal operation, since a smooth transition is anticipated.

The invention claimed is:

1. A method for controlling a transition between operating modes of a direct fuel injected Otto cycle engine, comprising:
adjusting an ignition angle in a retarded ignition direction in order to reduce a torque jump; and
injecting fuel into a cylinder of the engine in the form of multiple injections, wherein a quantity of the injected fuel is injected into the engine during a compression phase of the Otto engine cycle and when the Otto cycle engine is transitioning between a normal operation mode and an overrun fuel cut-off operation mode of the engine.

2. The method as claimed in claim 1, wherein the ignition angle is the crank shaft angle of rotation at the time an ignition signal is sent to a spark plug.

3. The method as claimed in claim 1, wherein the entire fuel quantity is injected in the compression phase.

4. The method as claimed in claim 1, wherein an engine intake air mass is reduced and then the ignition angle is decreased to a first minimum value which is predetermined for a reduced-air operating mode.

5. The method as claimed in claim 4, wherein a partial quantity of the injected fuel is injected during the compression phase after the first minimum value has been reached.

6. The method as claimed in claim 4, wherein the predetermined first minimum ignition angle provides stable combustion of a fuel-air mixture of the engine.

7. The method as claimed in claim 4, wherein the ignition angle is decreased to a second minimum value that is less than the first minimum value, the second minimum value being predetermined for the fuel injection.

8. The method as claimed in claim 7, wherein after the second minimum value has been attained, the fuel injection is cut off and the engine operation mode is switched from the normal operation mode to the overrun fuel cut-off operation mode.

9. The method as claimed in claim 8, wherein a partial quantity of the fuel is initially injected during the compression phase in order to return to the normal operation mode.

10. The method as claimed in claim 9, wherein the ignition angle is adjusted in the advanced ignition direction in order to increase the torque output of the engine.

11. The method as claimed in claim 10, wherein the switchover of the injection process from the compression phase to the intake phase occurs when a desired torque is attained.

12. A engine mode switchover apparatus that controls a transition operation of an Otto engine, comprising:
a fuel injector that injects fuel into a cylinder of the engine;
a device that determines a torque output of the engine;
a device that measures an ignition angle;
a device that stores a plurality of engine parameters;
a device that adjusts the ignition angle and an intake air mass of the engine; and
a device that controls the fuel injection having a control program, the control program adapted to reduce the ignition angle and subsequently inject the fuel into the cylinder during the compression phase of the engine and when the engine is transitioning between a normal operation mode and an overrun fuel cut-off operation and a subsequent return to normal operation of the engine.

13. The apparatus as claimed in claim 12, wherein the fuel is injected in a plurality of partial quantities.

14. The apparatus as claimed in claim 12, wherein the fuel injector injects the fuel directly into the cylinder.

15. The apparatus as claimed in claim 12, wherein the torque output of the engine is determined by a torque model.

16. An engine management system that controls a transition operation of an Otto engine, comprising:
a device for determining an angle of rotation of a crank shaft of the engine;
a throttle valve actuator;
an engine speed sensor;
a fuel injector that injects fuel directly into a cylinder of the engine;
a device that determines a torque output of the engine;
a device for measuring an ignition angle;
a device for storing a plurality of engine parameters;
a device for adjusting the ignition angle and an intake air mass of the engine; and
a device that controls the fuel injection having a control program, the control program adapted to reduce the ignition angle and subsequently inject the fuel into the cylinder during the compression phase of the engine and when the engine is transitioning between a normal operation and an overrun fuel cut-off operation mode and a subsequent return to normal operation mode of the engine.

17. The apparatus as claimed in claim 16, wherein the fuel is injected in a plurality of partial quantities.

18. The apparatus as claimed in claim 16, wherein the fuel injector injects the fuel directly into the cylinder.

* * * * *